United States Patent [19]
Roberts

[11] 3,883,303
[45] May 13, 1975

[54] METHOD FOR CONTROLLING ODORS IN RECIRCULATING TOILETS

[75] Inventor: George C. Roberts, Venice, Calif.

[73] Assignee: Inca-One Corporation, Culver City, Calif.

[22] Filed: June 15, 1972

[21] Appl. No.: 263,190

[52] U.S. Cl. ............................ 21/55; 4/222; 21/58; 210/64; 424/342
[51] Int. Cl. ...................... A61l 11/00; A61l 13/02
[58] Field of Search ....... 21/DIG. 3, 55, 58; 210/64; 260/606; 4/222, 231, 232, 115, 228; 424/334, 342

[56] References Cited
UNITED STATES PATENTS

| | | | |
|---|---|---|---|
| 1,027,000 | 5/1912 | Reuter | 424/334 |
| 1,083,561 | 1/1914 | Rising | 4/222 UX |
| 1,408,535 | 3/1922 | Ressler | 21/58 UX |
| 2,525,783 | 10/1950 | Farron | 127/71 |
| 3,107,216 | 10/1963 | Hamilton | 4/115 X |
| 3,183,525 | 5/1965 | O'Brien et al. | 4/115 X |
| 3,653,499 | 4/1972 | Richter | 424/342 |
| 3,785,971 | 1/1974 | Halley | 210/64 |

FOREIGN PATENTS OR APPLICATIONS
258,110    9/1926    United Kingdom

OTHER PUBLICATIONS

*Formaldehyde* by Walker, Reinhold Publishing Co., 1953, 2nd Edition, pgs. 122–125, 465–468; 87; Scientific Library QD 305.AGW3, 1953.

Primary Examiner—Morris O. Wolk
Assistant Examiner—Arnold Turk
Attorney, Agent, or Firm—Spensley, Horn & Lubitz

[57] ABSTRACT

A method for controlling odors as well as inhibiting the growth of microorganisms in recirculating toilets, septic tanks and holding tanks which contain water, organic waste material and microorganisms, by adding, to the water contained in the toilet, a composition containing borax and paraformaldehyde, the amount of paraformaldehyde added to the water being from 100 parts per million to 5,000 parts per million, by weight, based on the contents of the toilet. Preferably the amount of paraformaldehyde added is between 200 and 2,500 parts per million.

2 Claims, No Drawings

METHOD FOR CONTROLLING ODORS IN RECIRCULATING TOILETS

BACKGROUND OF THE INVENTION

In the past few years recreation vehicles such as boats, campers, trailers, etc. have increased greatly which, in turn, has increased the problem of disposing of human waste created by the people utilizing these recreation vehicles in out-of-the-way places where normal sewage disposal is not available.

Originally, some of these recreational vehicles such as boats, dumped the contents of the toilets directly into the ocean or lakes. The use of such types of toilets was not only impractical but also had a tendency to pollute our lakes and oceans because of the disposal therein of raw sewage.

In view of these many disadvantages, recreational vehicles, as well as planes, trains, busses, etc., are now being fitted with so-called recirculating toilets. A recirculating toilet recirculates the liquids contained in the toilet after removing the solid material. Consequently, the recirculating toilets utilize little or no water (they normally contain about 8 gallons of water) and take a relatively small space.

Inasmuch as the liquid is being recirculated it is essential, in order to have a satisfactory device, that the contents of the toilet be deodorized and sanitized. Heretofore, heavy metals were utilized to control the odor of the contents of a recirculating toilet or holding tank. However, when the contents of such toilets are dumped into sewage disposal systems, the heavy metals interfere with the sewage disposal systems and tend to provide environmental pollution and therefore the use of heavy metals in controlling odors and sanitation conditions of recirculating toilets is far from satisfactory.

SUMMARY OF THE INVENTION

It is the primary object of the present invention to disclose and provide a method for controlling odors and inhibiting the growth of microorganisms in recirculating toilets, septic tanks and holding tanks without harming sewage disposal systems when the contents of such toilets and tanks are dumped therein.

A further object of the present invention is to disclose and provide a safe and convenient method for controlling odors or organic waste material contained in recirculating toilets and sewage retention tanks.

A further object of the present invention is to disclose and embody a method for controlling odors in recirculating toilets by adding thereto an easily handled solid composition which releases the active ingredient for controlling odors slowly, uniformly and as needed as determined by the rate of toilet use.

Still a further object of the present invention is to provide and embody a method for controlling odors and inhibiting the growth of microorganisms in recirculating toilets containing water and organic waste material by adding to the water a solid compositions which will also cleanse the toilet bowl and which can be handled safely.

Other objects of the present invention will be apparent from the following detailed description.

In general, the foregoing objects of the present invention, and others, are accomplished by providing a composition containing, as the active deodorizing substance, solid paraformaldehyde in an amount sufficient only to deodorize organic waste material and control microorganisms growth therein but insufficient to kill the microorganisms.

Inasmuch as paraformaldehyde is soluble in water the paraformaldehyde can be added to the bowl of the recirculating toilet (which generally contains about 8 gallons of water) and the toilet flushed whereby a certain percentage of the paraformaldehyde will dissolve in the water thereby forming a solution of formaldehyde. The solubility of the paraformaldehyde depends upon the pH of the water and therefore the amount of formaldehyde in solution can be controlled to provide just the right amount of formaldehyde to produce the desired affects. As the formaldehyde is used up in the deodorizing process more paraformaldehyde will dissolve to produce more formaldehyde in solution thereby preventing constant amounts of formaldehyde in solution which is available for deodorizing.

DESCRIPTION OF THE PREFERRED EMBODIMENT:

Paraformaldehyde is generally a free-flowing solid and is a mixture of polyoxymethylene glycols of fairly short chain length. Generally, paraformaldehyde contains from 90% to 95 percent formaldehyde and from 5 to 10 percent water. The water content is present in both the free and combined form. Water that is chemically bound with the paraformaldehyde acts as a terminating agent of the polymer chain. Generally speaking, paraformaldehyde is considered to have the following formula: $HO(CO_2O)_nH$ where $n$ equals 6 or more.

Depending upon the pH and temperature the rate at which the paraformaldehyde dissolves varies. Moreover, the mechanism by which paraformaldehyde dissolves is affected by the pH, at low pH the oxygen linkages of the polyoxymethylene molecules are successfully hydrolyzed to produce formaldehyde whereas when the pH is in the alkaline region the hydroxyl end groups are attacked and degradation of the polyoxymethylene glycol molecule proceeds in step-wise fashion with successive splitting of the formaldehyde from the ends of the chain. However, regardless of the mechanism of solution of the paraformaldehyde the resulting solution of formaldehyde is the same.

In addition to the effect of the pH on the solubility of paraformaldehyde in water, temperature also has an effect. In cold water paraformaldehyde will generally not dissolve readily, therefore, in most applications, the water is heated to increase the solubility of the paraformaldehyde. However, in the instant invention it is contemplated that the paraformaldehyde will be added to water at room temperature, i.e., the temperature of the water will be between the freezing point and 30° or 40°C. e.g. from about 10° or 20°C. to 40°C.

As noted above, the pH of the water has an effect on the solubility of the paraformaldehyde. Generally, the solubility of the paraformaldehyde in the water is greatest at a low pH, for example, from 0 to 2, and at a high pH, for example from about 11 to 14. In between these ranges the solubility is less with the lowest solubility being about 2 to 5.0, on the acid side. At about 5.0 to 8.0 the solubility increases but does not reach that attained at the high and low ends of the pH range. It is desirable in the present invention to have a solubility relatively high but not as high as occurs in the 0 to 2 pH range because when utilized in the pH range of say between 5 to 8 or preferably between 6 and 7 the relatively slow solution rates of paraformaldehyde make it an ideal deodorizing agent since the paraformaldehyde will essentially hydrolyze to form formaldehyde as needed. At the same time the solubility is sufficiently great so that a sufficient amount of formaldehyde is in solution to inhibit microorganism growth in a reasonable time.

When the formaldehyde in solution reacts with bioorganics and is thereby removed from the solution, additional and controlled quantities of paraformaldehyde will dissolve to maintain formaldehyde concentration consistent with the pH of the solution. By means of this controlled solution rate, the formaldehyde concentration is not in excess which avoids the danger of formaldehyde volatilizing into the air, particularly in enclosed areas. As is known in the art, formaldehyde vapors in concentrations of 5 parts per million or greater are very irritating to the eyes and mucous membranes. Moreover, because paraformaldehyde hydrolyzes slowly it provides a deodorizing action for a longer period of time than a formaldehyde solution of the same concentration.

The pH of precharge solution, i.e. the inlet with flushing water, prior to the addition of waste material, is preferably adjusted to about a pH of 7 by the addition of a mixture of paraformaldehyde and a water soluble basic material such as borax. The resulting aqueous solution has a minimum solubility constant for paraformaldehyde which rises as the pH shifts to the acid side. This is desirable because prior to use, the recirculating toilet generally contains only water and no waste material. As waste material is added to the toilet, the pH shifts to the acid side which increases the solubility of paraformaldehyde thereby providing formaldehyde in solution to react with microorganisms and bioorganics found in human waste. This reaction shifts the equilibrium so that more formaldehyde is in solution and therefore allows formaldehyde to dissolve to accumulate for reaction with additional waste.

DESCRIPTION OF THE PREFERRED EMBODIMENTS:

The ideal manner of adding paraformaldehyde to water in toilets is to package the paraformaldehyde in a container so that all of the paraformaldehyde in the container, when added to the circulating toilet, will provide the requisite amount of formaldehyde in solution to deodorize the circulating toilet until it is ready to be disposed of in a sewage system. It is also generally preferred if the formaldehyde is packaged in a composition containing a surface active agent (wetting agent) a coloring agent, and a perfume which has a pleasant odor.

I have found that in a recirculating toilet having 8 gallons of water the average number of uses will be 45. Of these, 39 will be urinations and 6 will be defecations. Normally, the pH of urine varies from about 5 to 7 and the pH of human feces will vary between 4.6 and 7. Since a solution of formaldehyde is acid (about a pH of 3 depending on the concentration) if nothing is added to the contents of a recirculating toilet it will be on the acid side and will generally be below about 5.0. In order to increase the solubility of paraformaldehyde it is often times desirable to add a base to the water which will not react with formaldehyde in order to have the pH above 5.0 to 6.0 and preferably above 6.4. Generally speaking, I have found that very desirable results are obtained if the pH is between 6.0 and 7 or 8 and preferably between 6.4 and 7 or 8.

As noted above, using a basic compound in conjunction with the paraformaldehyde is sometimes desirable because of the fact that water containing formaldehyde, urine and feces of humans will generally be on the acid side (generally below a pH of 5). Thus, if the pH of the water is raised above 5 or 6 the concentration of formaldehyde in the water would, under certain conditions, be optimal and the amount of paraformaldehyde added would be less in order to maintain the same concentration of formaldehyde in solution. In order to attain this feature I have found that the addition of alkaline compounds which will not react with formaldehyde are desirable. Generally, strongly basic compounds such as ammonium hydroxide and sodium hydroxide react with formaldehyde to form, in the case of sodium hydroxide, formic acid and methyl alcohol. It is quite clear that basic compounds which react with the formaldehyde should be avoided. I have found that, in general, weak bases are preferred. An excellent compound for this purpose is borax. Borax is soluble in water and is a weak base. Moreover, borax is a good cleansing agent.

I have found that an ideal composition for recirculating toilets is as follows:

| MATERIAL | WEIGHT PERCENTAGE |
|---|---|
| Paraformaldehyde | 62 |
| Borax | 31.93 |
| Blue Dye | 1.25 |
| Pine Oil | 2.73 |
| Pine Essence | 1.37 |
| Surfactant | 0.72 |

Both the pine oil and pine essence are utilized in order to give the composition and toilet a pleasing aroma. In addition natural pine oil contains terpenes which are very effective natural antiseptics which are effective germicides. Pine oil complements the effectiveness of formaldehyde in providing a broad spectrum bacteriastatic preparation. The dye is utilized in order to give a pleasant color while the surfactant is utilized in order to insure that the bowl is wetted. In addition the surfactant greatly aids in the solubility of the borax which provides the weak base to raise the formaldehyde solution to neutral range pH values. The borax is utilized both for its cleansing property as well as the fact that it is a weak base.

For an 8 gallon toilet I have found that very desirable results are obtained if the above composition is packaged in containers containing about 2 ounces (56.8 grams). Adding this amount of the above composition to a recirculating toilet will result in a concentration of formaldehyde of about 1,046 parts per million.

At this concentration the resulting formaldehyde in solution will deodorize the toilet as well as act as an antiseptic, i.e., it will inhibit the growth of microorganisms and viruses but will not kill them. At higher concentrations, formaldehyde will disinfect or kill microorganisms and viruses. It is preferred if the amount of formaldehyde is insufficient to kill the microorganisms for reasons which will be given below.

Generally speaking, at least 50 parts per million of formaldehyde is required in order to inhibit microorganisms, however, some certain microorganisms require 100 parts per million to inhibit them. Therefore, it is preferred if the amount of paraformaldehyde present is at least 100 parts per million. While concentrations of 100 to 5,000 parts per million, by weight, of paraformaldehyde have yielded excellent results, it is generally desirable to add between 200 and 2,500 parts per million of paraformaldehyde for most applications.

The formaldehyde also acts as an indirect antiseptic because it will react with carbohydrates, sugars, and starch to form unstable hemiacetals and methylene ethers. This prevents the carbohydrates from being available to microorganisms as nutrients and therefore, as noted above, is an indirect antiseptic reaction since it reduces or eliminates an essential nutrient for microbial growth. Moreover, formaldehyde reacts with the aldehyde group in nucleic acids which inactivates viruses and bacteria because nucleic acids are the basic structure of the gene mechanisms responsible for the growth of these organisms. The reaction of formaldehyde with the nucleic acid destroys the biological activity of nucleic acids.

As a deodorizer, formaldehyde works in part because it reacts with mercaptans which produce much of the foul odors associated with untreated sewage.

One of the main advantages of using paraformaldehyde in treating recirculating toilets, holding tanks, and septic tanks is the fact that formaldehyde, in the concentrations utilized, does not have an adverse effect on sewage systems. As has been noted, heavy metals have heretofore been utilized to treat recirculating toilets. However, when the waste treated with heavy metals are disposed of by dumping them into a sewage treatment system the heavy metals are not converted into harmless compounds by the sewage treatment and therefore the concentration of heavy metals continue to build up in the microorganisms utilized to treat the sewage. Moreover, when the treated sewage is disposed of, for example, by being dumped into streams, oceans or utilized as landfill, the heavy metals eventually enter into the biological cycle from plant life to fish and shell fish and eventually into man. If the metal contaminated waste are used for landfill there will be water contamination due to run off. Moreover, if feed crops are grown on such landfill there will be metal build up in animals eating such feed crops and a metal build up in man eating such animals.

Formaldehyde, in complete contrast to the heavy metals, is oxidized during sewage treatment to harmless compounds by the microorganisms present in the sewage. In this regard, it is noted that in general most sewage treatment plants remove organic solids by biological oxidation. In this treatment, microorganisms, i.e., bacteria and fungi, utilize the organic solids as nutrients and thereby break them down into simple and innocuous compounds such as $CO_2$, $H_2O$, and $CH_4$. The same microorganisms also oxidize formaldehyde to innocuous compounds. However, as has been noted, formaldehyde can inhibit or kill these microorganisms which would interfere with sewage treatment. For example, it has been reported that the inhibitory concentration of formaldehyde in the sewage is between 130 and 175 parts per million. However, it has also been found that it is possible to adapt the microorganisms so that these organisms will oxidize larger concentrations of formaldehyde. It is also possible to dilute the formaldehyde so that the microorganisms can handle the formaldehyde. This ability of aerobic digestion systems to oxidize formaldehyde is a marked advantage of formaldehyde over heavy metals such as zinc because, as noted above, the heavy metals will not be altered by aerobic digestion systems.

Utilizing the present preferred formulation, I have found that in a very small sewage treatment system (about 5,000 gallons) the number of toilets utilizing the composition of this invention which can be safely dumped into such a small sewage treatment system daily is at least 50. Thus, it can be seen that there is no problem with disposing of sewage waste treatment with paraformaldehyde.

I claim:

1. A method for controlling odors and inhibiting growth of microorganisms in recirculating toilets containing water, organic waste material and microorganisms which consists essentially in: mixing paraformaldehyde with the water contained in said toilet, said water having a temperature of between 0°C and 40°C and containing borax to adjust the pH of the water and paraformaldehyde to between 5 and 8, the amount of paraformaldehyde being from 100 part per million to 5,000 parts per million, by weight, based upon the contents of the toilet so that sufficient paraformaldehyde dissolves in said water and slowly releases formaldehyde to form a solution and to react with any mercaptans, bioorganics and other components of human waste contained in the toilet and to inhibit the growth of microorganisms without killing said microorganisms and thus not interfering with subsequent biological decomposition on later dumping of the contents of the recirculating toilet, said components of human waste tending to lower the pH of the solution to the acidic side thus increasing the solubility of the paraformaldehyde and thereby providing more formaldehyde in solution for reaction with additional components of human waste while said borax, without reacting with said formaldehyde in solution is tending to raise said pH above about 5 to control and maintain the desired concentration of formaldehyde in solution.

2. A method according to claim 1 wherein the amount of paraformaldehyde dissolved in said water is from 200 to 2,500 parts per million, by weight.

* * * * *